Figure 1:
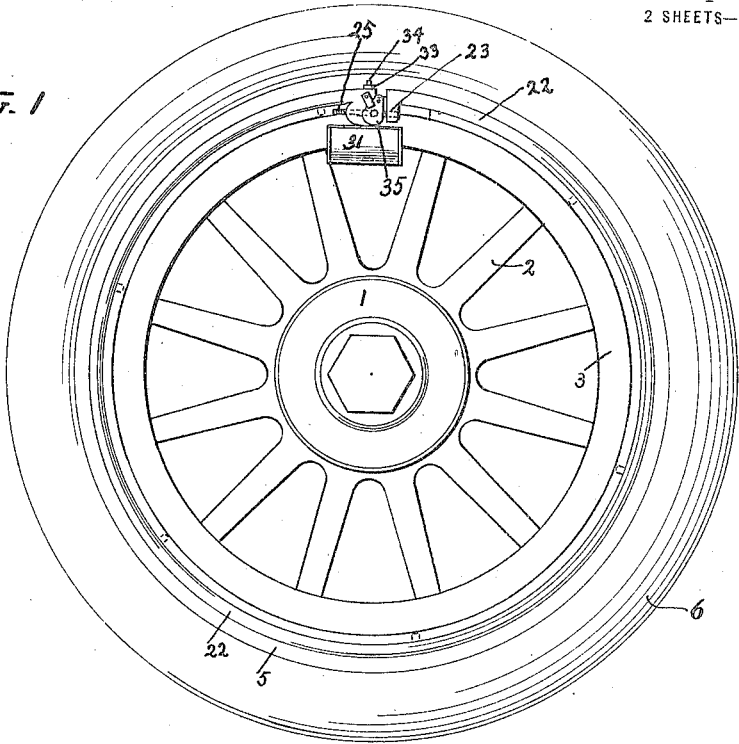

H. KAPLAN.
WHEEL RIM LOCK.
APPLICATION FILED SEPT. 16, 1914.

1,180,501.

Patented Apr. 25, 1916.
2 SHEETS—SHEET 1.

WITNESSES
A. H. Kephart
Leon Boillot

INVENTOR
H. KAPLAN
Carlos P. Griffin
ATT'Y.

H. KAPLAN.
WHEEL RIM LOCK.
APPLICATION FILED SEPT. 16, 1914.
1,180,501.
Patented Apr. 25, 1916.
2 SHEETS—SHEET 2.
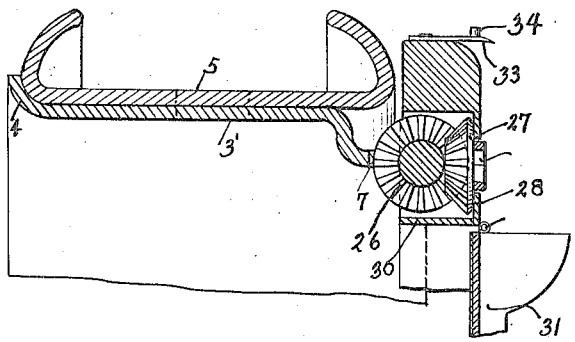
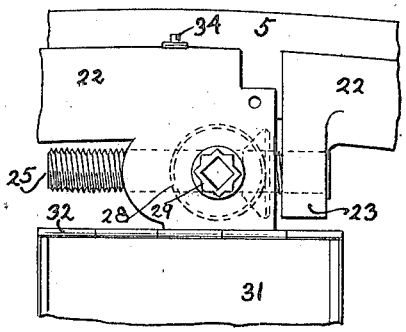
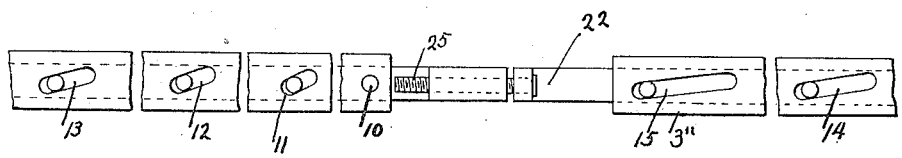
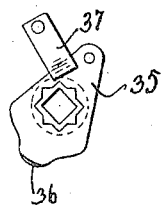
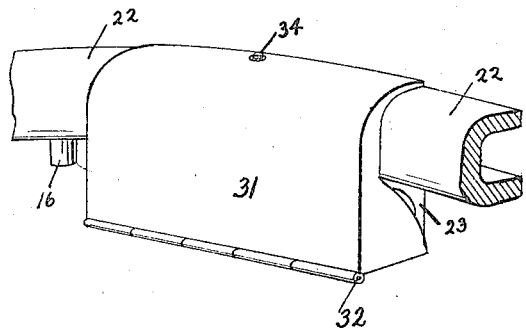
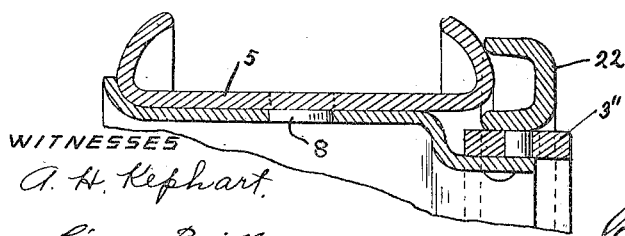
WITNESSES
A. H. Kephart.
Léon Boillot
INVENTOR
H. KAPLAN
Carlos P. Griffin
ATTY.

UNITED STATES PATENT OFFICE.

HENRY KAPLAN, OF SAN FRANCISCO, CALIFORNIA, ASSIGNOR, BY DIRECT AND MESNE ASSIGNMENTS, TO LONG MANUFACTURING COMPANY, A CORPORATION OF CALIFORNIA.

WHEEL-RIM LOCK.

1,180,501.  Specification of Letters Patent.  Patented Apr. 25, 1916.

Application filed September 16, 1914. Serial No. 861,999.

*To all whom it may concern:*

Be it known that I, HENRY KAPLAN, a citizen of the United States, residing at San Francisco, in the county of San Francisco, State of California, have invented a new and useful Wheel-Rim Lock, of which the following is a specification in such full and clear terms as will enable those skilled in the art to construct and use the same.

This invention relates to a detachable rim for wheels having pneumatic tires thereon.

It will be understood by those skilled in the art that it is common to provide certain classes of vehicles with rims which can be removed from the wheels easily, an extra rim and tire being carried to provide for easy changes when a tire is punctured.

An object of the invention is to provide for the quick removal and replacement of such rims, as well as to provide means whereby the rim may be secured tightly in the desired position.

Another object of the invention is to provide means for covering the locking ring operating mechanism so that it will not get filled up with mud and dirt.

A further object of the invention is to provide means to secure the locking ring in place which will reduce the cost of the felly band, slots being formed therein to secure the ring in place.

An embodiment of the invention is shown in the drawing in which the same reference numeral is applied to the same portion throughout, but I am aware that there are many modifications thereof.

Figure 2:
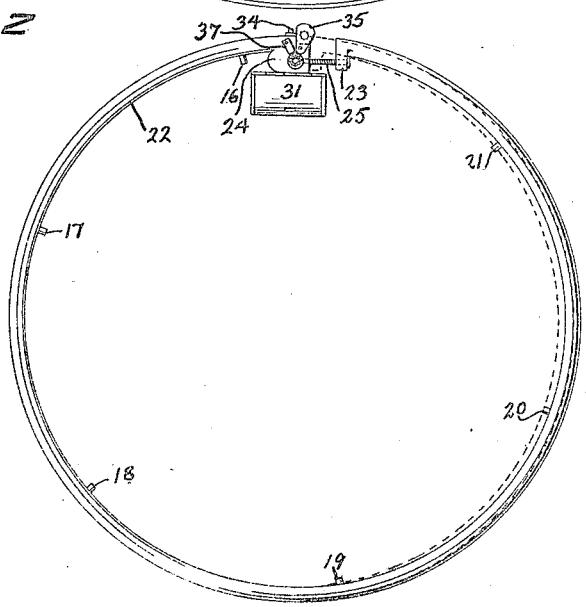

Figure 1 is a side elevation of a complete wheel having this rim locking ring thereon, Fig. 2 is a side elevation of the rim locking ring open, Fig. 3 is a transverse sectional view of the felly band and rim adjacent the ring locking device adjacent the operating mechanism, Fig. 4 is a side elevation of the ring locking device at its ends, Fig. 5 is a development with parts broken away of the slotted locking band which is fastened to and becomes a part of the felly band illustrating the position of the locking ring and its lugs therein, Fig. 6 is a side elevation of the device for holding the operating mechanism in any given adjustment, Fig. 7 is a perspective view illustrating the locking ring and the cover for the ends of the ring in a closed position, and Fig. 8 is a transverse sectional view of the felly band showing the rim as it appears when locked in position thereon.

It will be understood that while a wood wheel has been illustrated the device is applicable to any type of wheel.

The numeral 1 is applied to the hub of the wheel, 2 indicating the spokes and 3 the felly. The felly band 3' is of a type having one side bent outwardly as at 4 to provide a backing for the detachable rim 5 in which is placed a well known form of pneumatic tire 6.

The felly band has a notch 7 cut in one edge and a hole 8 for the tube valve pipe. Secured to the felly band is a slotted locking band 3″ having a series of openings 10 to 15 inclusive. The hole 10 is shaped to fit the short lug 16 on the ring 22, said ring having other lugs 17 to 21 inclusive projecting inwardly therefrom.

It is to be noted that in order to remove the ring from the felly that it is necessary to move its ends about one and one half inches away from each other, with a thirty-two inch wheel, to lift all of the lugs except 16 out of the slots in which they are intended to pass.

At its ends the ring 22 is provided with two inwardly projecting lugs 23 and 24, to the former of which a threaded rod 25 is secured. A small nut 26 having bevel gear teeth formed thereon is threaded on the rod 25 and it is in mesh with a second bevel gear 27 seated in a hole of an extension 28 of the lug 24. The gear 27 has a square hole in the center thereof and the hub is star shaped for a portion of its length as indicated at 29 to provide means for locking it in a given adjustment. One end of the ring has a box 30 secured thereto, the other end of said ring being slidable thereinto. The box has a cover 31 hinged thereto at 32 while a spring 33 on the ring 22 having a lug 34 locks the cover in the closed position and may be unlocked by pushing the lug 34 out of the hole in the cover in which it is seated.

A plate 35 is pivoted on the portion 28 and has an opening therein which will hold the gear 27 in any adjustment each 45 degrees of turn. The plate has a finger lug 36 and is held down by the spring 37 under which it passes when in position on the hub of the gear 27.

The operating of the device is as follows: Assuming a tire to be on the rim 5 and placed in position on the felly band, the ring is then opened as shown in Fig. 3. When the ring is opened the lug 16 is placed in the hole 10, the ring being positioned on the felly band and the other lugs 17 to 21 being in position to move into the slots 11 to 15 inclusive. Now, it will be seen that the slots 11 to 15 are inclined and are of different lengths from 15 which is substantially the full length of the movement of the end of the ring while the other slots are varying lengths down to 11 which is very little larger than the lug which seats therein. The slots also cause the lugs and the ring secured thereto to move transversely of the felly band against the inside of the demountable rim to secure it firmly against the raised side of the felly band.

The cover is lined with a rubber material R to make it substantially watertight to prevent the access of dirt to the operating parts.

It will be clear that the ring 22 without change might equally well be used for locking a tire in place on the wheel instead of a clencher rim as illustrated.

Having thus described my invention what I claim as new and desire to secure by Letters Patent of the United States, is as follows, modifications within the scope of the claims being expressly reserved:

1. A wheel rim lock comprising a wheel rim, a split ring therefor having inwardly projecting lugs, the wheel felly band having closed end slots of different length to coöperate with the ring lugs, a threaded rod secured to one end of the ring, a lug on the other end of the ring through which said rod passes, and a nut on the rod for drawing the ends of the ring together and the lugs into said slots.

2. A device for securing rims on wheels comprising the combination with a wheel of a split ring, the wheel felly band having means to coöperate with the ring to secure it thereto, a threaded rod secured to one end of the ring and extending through a lug in the other end of the ring, a nut threaded on the rod and having gear teeth thereon, and a second gear having its teeth in mesh with the first gear for drawing the ends of the ring together.

3. A device for securing rims on wheels comprising the combination with a wheel having a slotted felly band of a split ring having lugs adapted to pass into the felly band slots, a threaded rod carried by one end of the ring, a lug on the other end of the ring and through which the rod passes, a threaded bevel gear on the rod, and a second gear in mesh with the first gear for opening and closing the ring.

4. A demountable rim lock comprising the combination with a wheel of a split ring, the wheel felly band having means to coöperate with the ring to secure it thereto, a threaded rod extending from one end of the ring, a lug on the other end of the ring through which the rod extends, a bevel gear nut on the rod for drawing the ends of the ring together, a second bevel gear in mesh with the first bevel gear and revoluble on an axis transverse to the axis of the rod, and means to lock the second gear in any given adjustment.

5. A demountable rim lock comprising the combination with a wheel of a split ring, the wheel felly band having means to coöperate with the ring to secure it thereto and to move it transversely against a rim on the wheel, a threaded rod extending from one end of the ring, a lug on the other end of the ring through which the rod extends, and a bevel gear having its bore threaded on the rod for drawing the ends of the ring together.

6. A device for securing rims on wheels comprising the combination with a wheel of a split ring having inwardly projecting lugs, the wheel felly band having closed end slots to coöperate with the ring to secure it thereto, a threaded rod secured on the other end of the ring and which extends through a lug on the opposite end of the ring, a nut threaded on the rod, means to rotate said nut, and a cover surrounding the nut and threaded rod for preventing the access of mud and dirt thereto.

7. A device for securing rims on wheels comprising the combination with a wheel of a split ring, a slotted felly band, lugs carried by the ring and adapted to pass into the felly band slots, a threaded rod carried by one end of the ring, a lug on the other end of the ring and through which said rod passes, a threaded bevel gear on the rod, a second gear in mesh with the first gear for opening and closing the ring, and a locking plate adapted to contact with the hub of the second gear to hold it in any given adjustment.

8. A device for securing rims on wheels comprising the combination with a wheel of a split ring, a felly band having a plurality of slots of different lengths, certain of said slots extending at an angle to the plane of rotation of the wheel, lugs carried by the ring and adapted to pass into said slots, and means to draw the ends of the ring together to secure the ring on the felly band and to secure a rim in place on the wheel.

9. A device for securing rims on wheels comprising the combination with a wheel of a split ring, the wheel felly band having a plurality of slots of different lengths, said slots being inclined at an angle to the plane of rotation of the wheel, lugs carried by the ring and adapted to pass into said slots, a threaded rod secured to one end of the ring, a lug carried by the other end of the ring and through which the end of said rod extends, and a nut threaded on the rod for drawing the ends of the ring together.

In testimony whereof I have hereunto set my hand this 11th day of September, A. D. 1914, in the presence of the two subscribed witnesses.

HENRY KAPLAN.

Witnesses:
CARLOS P. GRIFFIN,
HENRY B. LISTER.